United States Patent [19]

Castle

[11] Patent Number: 4,768,174

[45] Date of Patent: Aug. 30, 1988

[54] METHOD FOR GENERATING AND COLLECTING RANDOM VIBRATORY SEISMIC DATA WHEREIN A PRE-SPECIFIED WAVELET OF MINIMUM SIDE LOBE CONTENT IS ALWAYS PRODUCED IN THE FINAL CORRELATIONS BY MAINTAINING DOMAIN CONSISTENCY

[75] Inventor: Richard J. Castle, Belmont, Calif.

[73] Assignee: Chevron Research Company, San Francisco, Calif.

[21] Appl. No.: 913,059

[22] Filed: Sep. 29, 1986

[51] Int. Cl.$^4$ .............................................. G01V 1/00
[52] U.S. Cl. ...................................... 367/39; 367/41; 364/421
[58] Field of Search ............... 364/421, 422, 717, 728, 364/821; 367/37, 38, 39, 41, 47, 48, 49, 55, 56, 57, 60, 63, 65, 66, 67, 100, 189, 190

[56] References Cited

U.S. PATENT DOCUMENTS

| 2,688,124 | 8/1954 | Doty et al. | 367/38 |
| 4,168,485 | 9/1979 | Payton | 367/41 |
| 4,486,866 | 12/1984 | Muir | 367/39 |
| 4,601,022 | 7/1986 | Muir | 367/14 |

OTHER PUBLICATIONS

Waters, Kenneth, Reflection Seismology, A Tool for Energy Resource Exploration, 7/1978, Wiley Interscience Publication, pp. 98–99.

Lewis et al., A Pseudo-Random Number Generator for the System/360, by IBM System Journal, No. 2 (1969), pp. 136–146.

Ricker, Norman, The Form and Laws of Propagation of Seismic Wavelets, Oct. 1952, Third World Petroleum Congress, pp. 10–40.

Knuth, Generating Uniform Random Numbers, 3.2.2, Seminumerical Algorithms (vol. 2 of "Art of Computer Programming", Addison Wesley Pub. Co.), pp. 9–37.

*Primary Examiner*—Deborah L. Kyle
*Assistant Examiner*—Brian S. Steinberger
*Attorney, Agent, or Firm*—S. R. La Paglia; E. J. Keeling; Vern Norviel

[57] ABSTRACT

A method of producing random sweeps for seismic vibrator sources is described which produces correlograms with reduced side lobe contamination. Digital random phase digital codes activate non-impulsive sources. Detected signals are processed using periodic sweep correlations. The method is especially useful in urban areas where permitting requirements limit the drive level and frequency range of a vibratory seismic source.

12 Claims, 11 Drawing Sheets

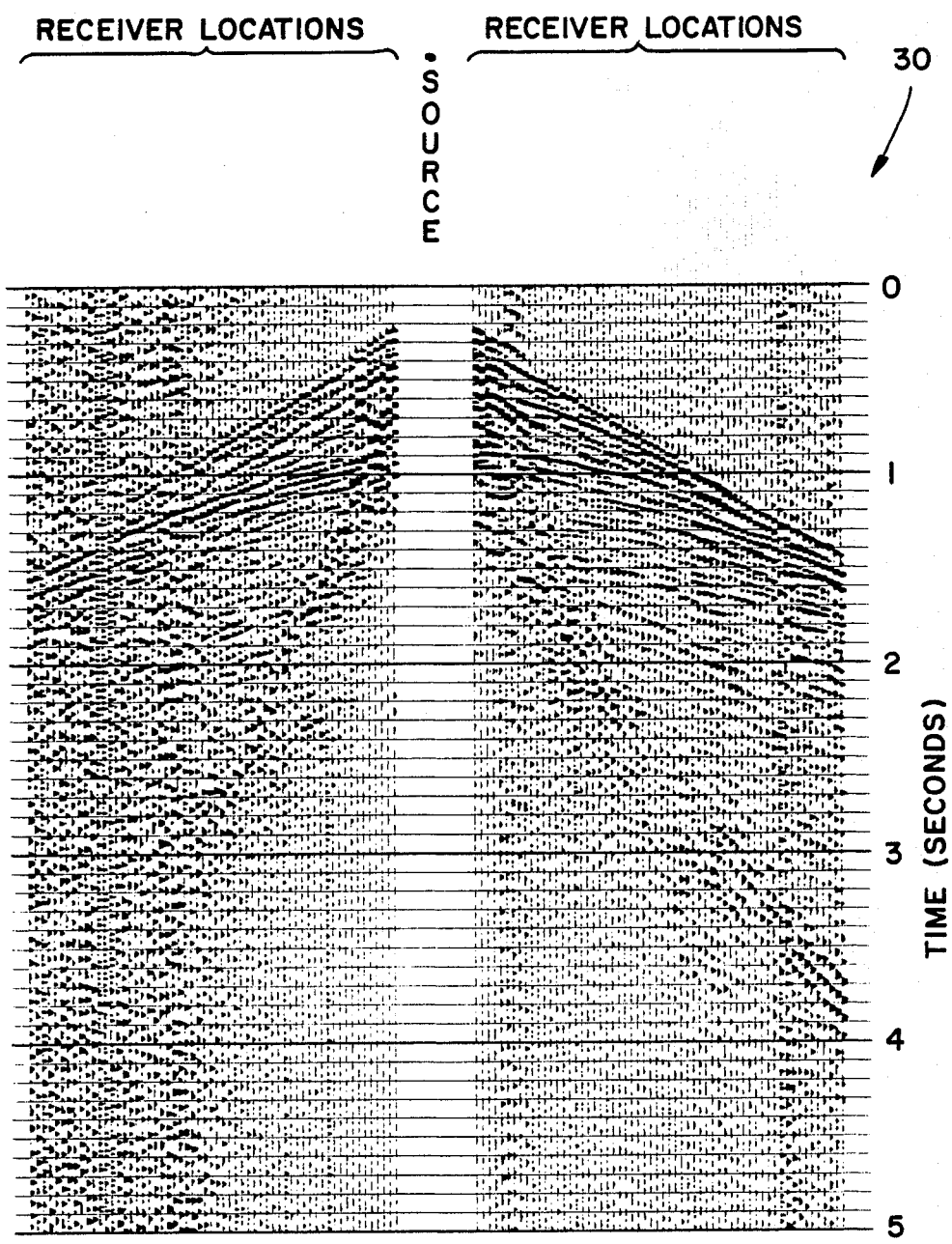
FIG _ 2

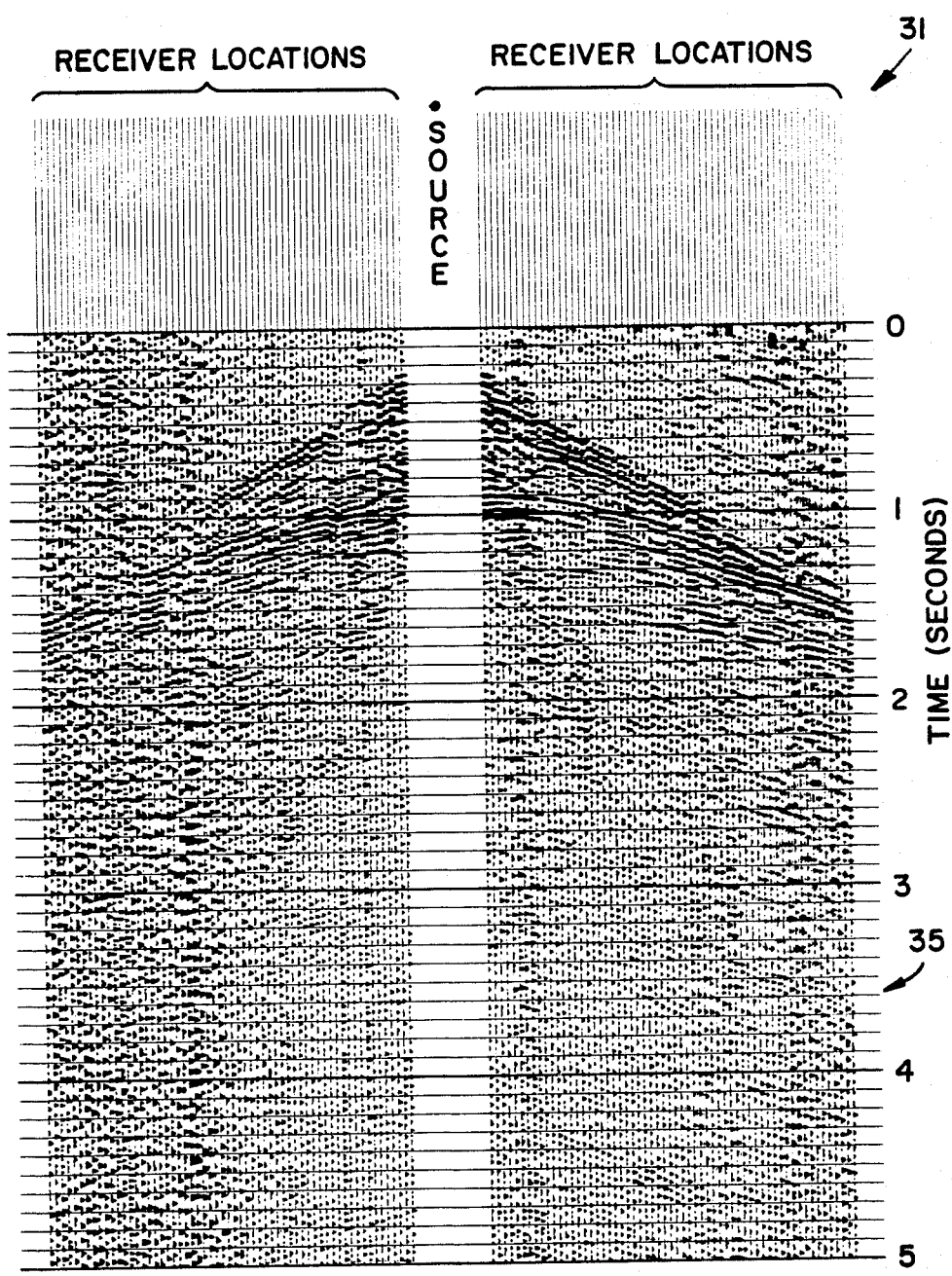
FIG _ 3

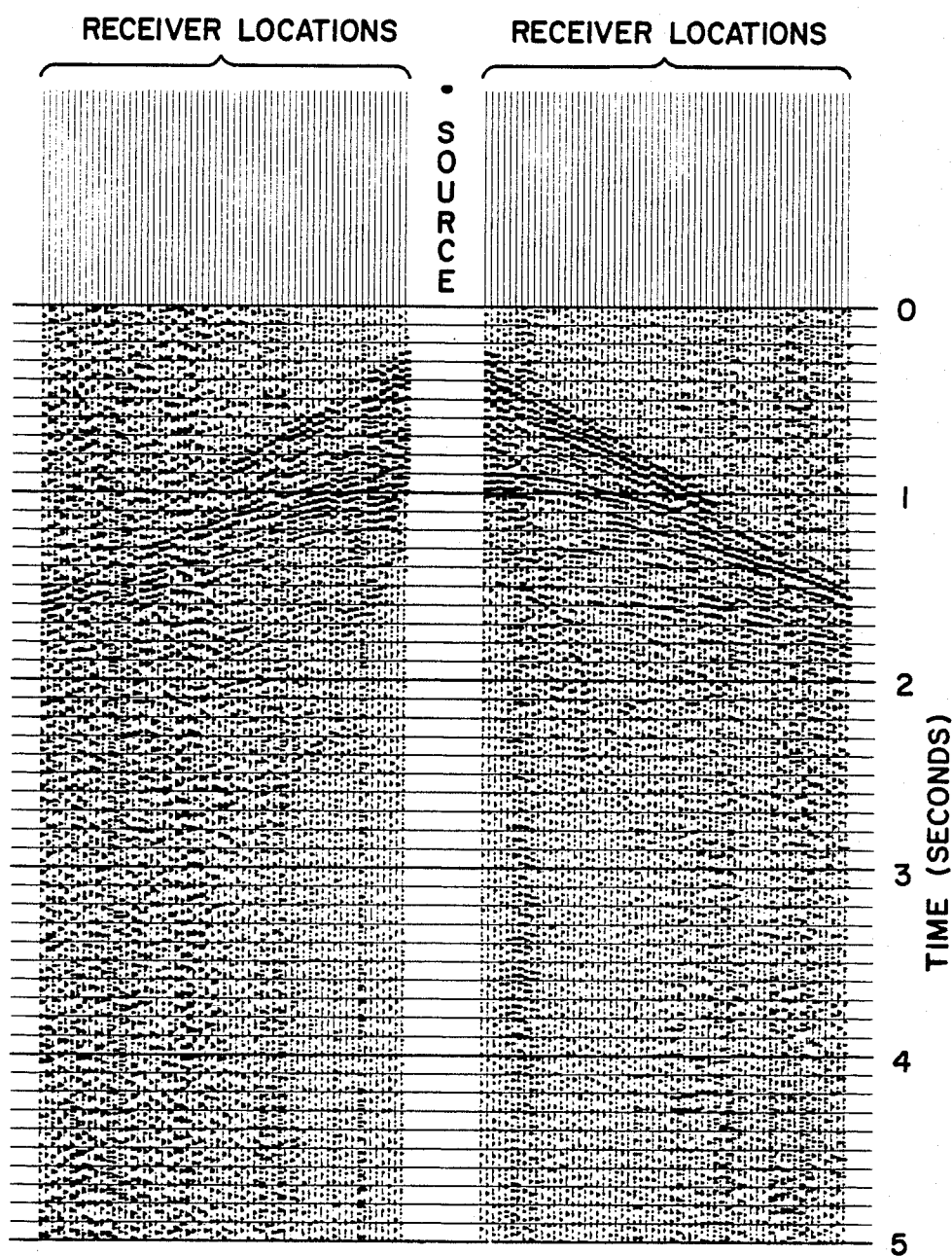
RANDOM PHASE SWEEP - PERIODIC CORRELATION
FIG _ 4

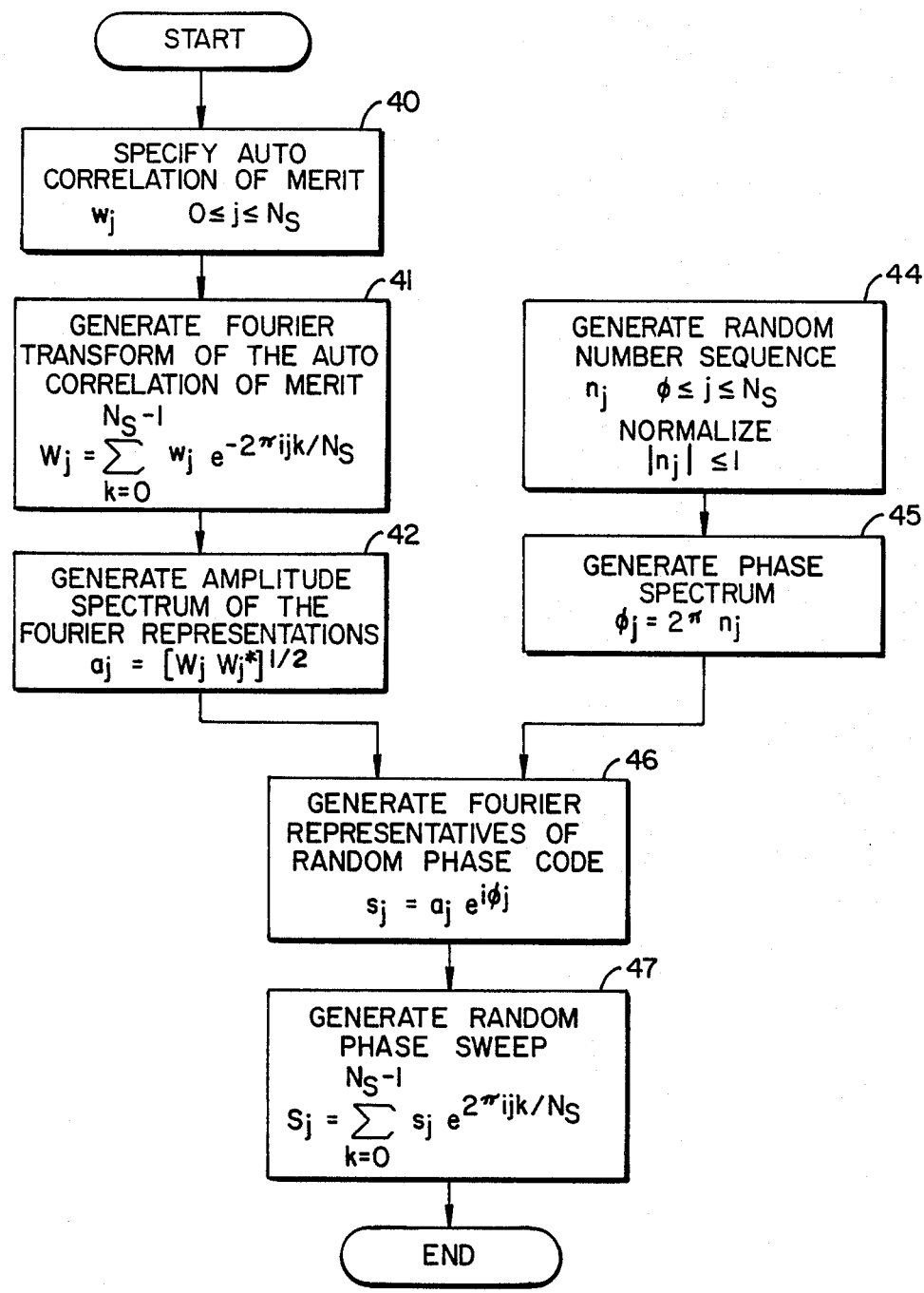
FIG _ 5

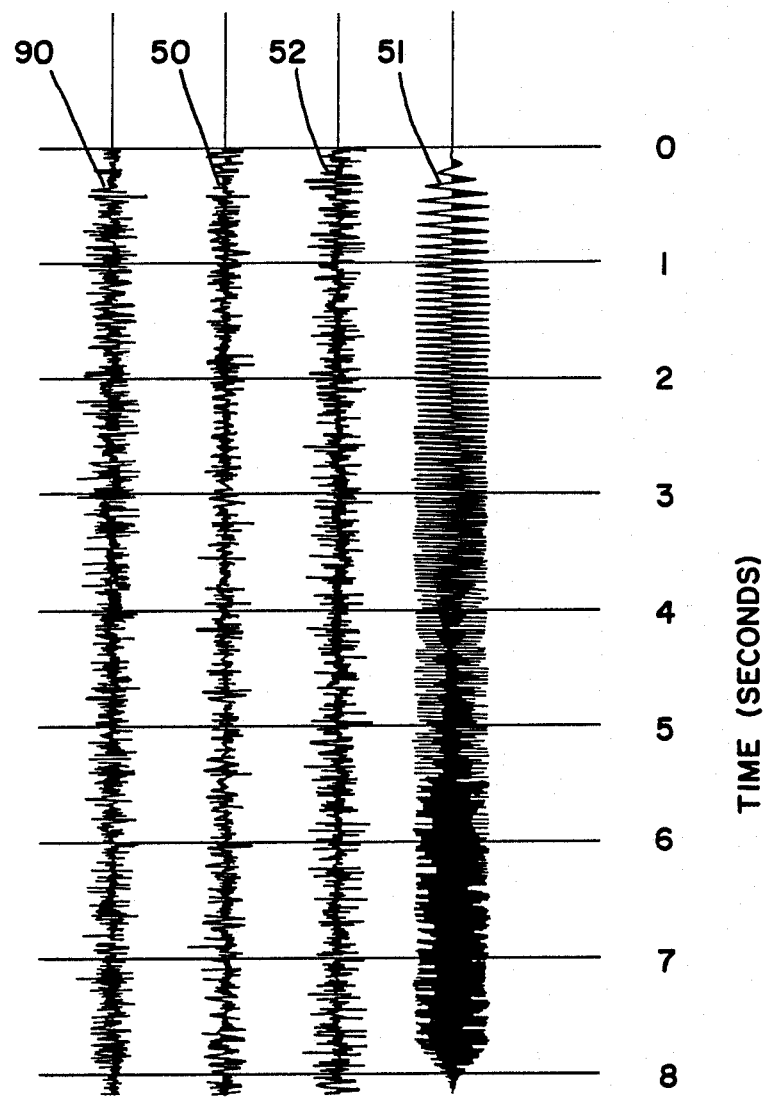
FIG _ 6

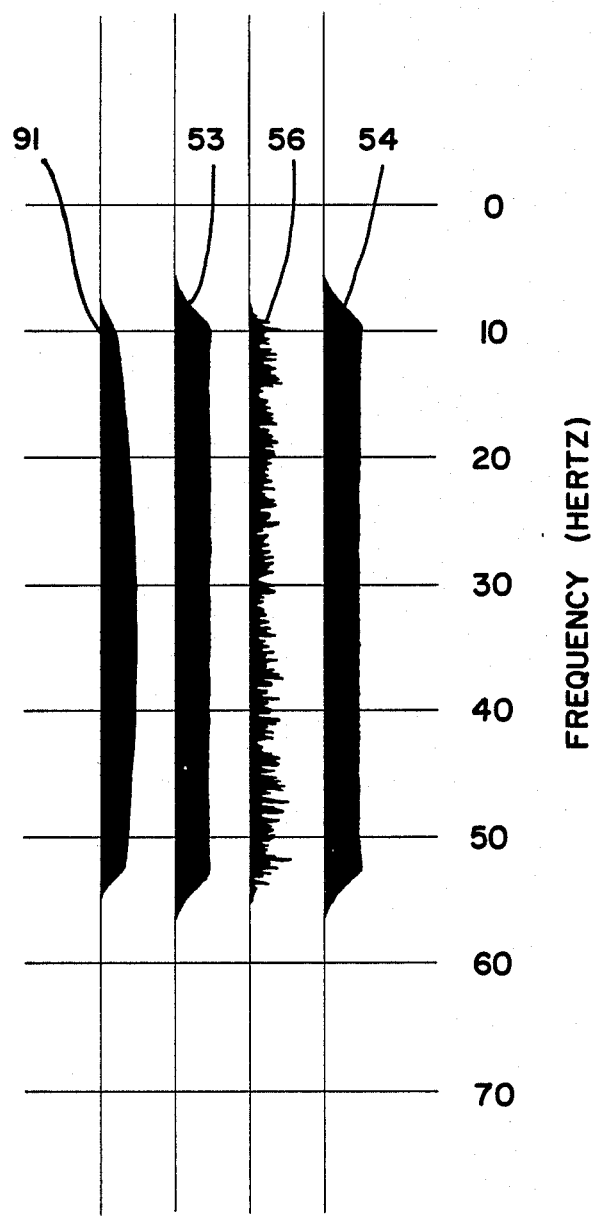
FIG _ 7

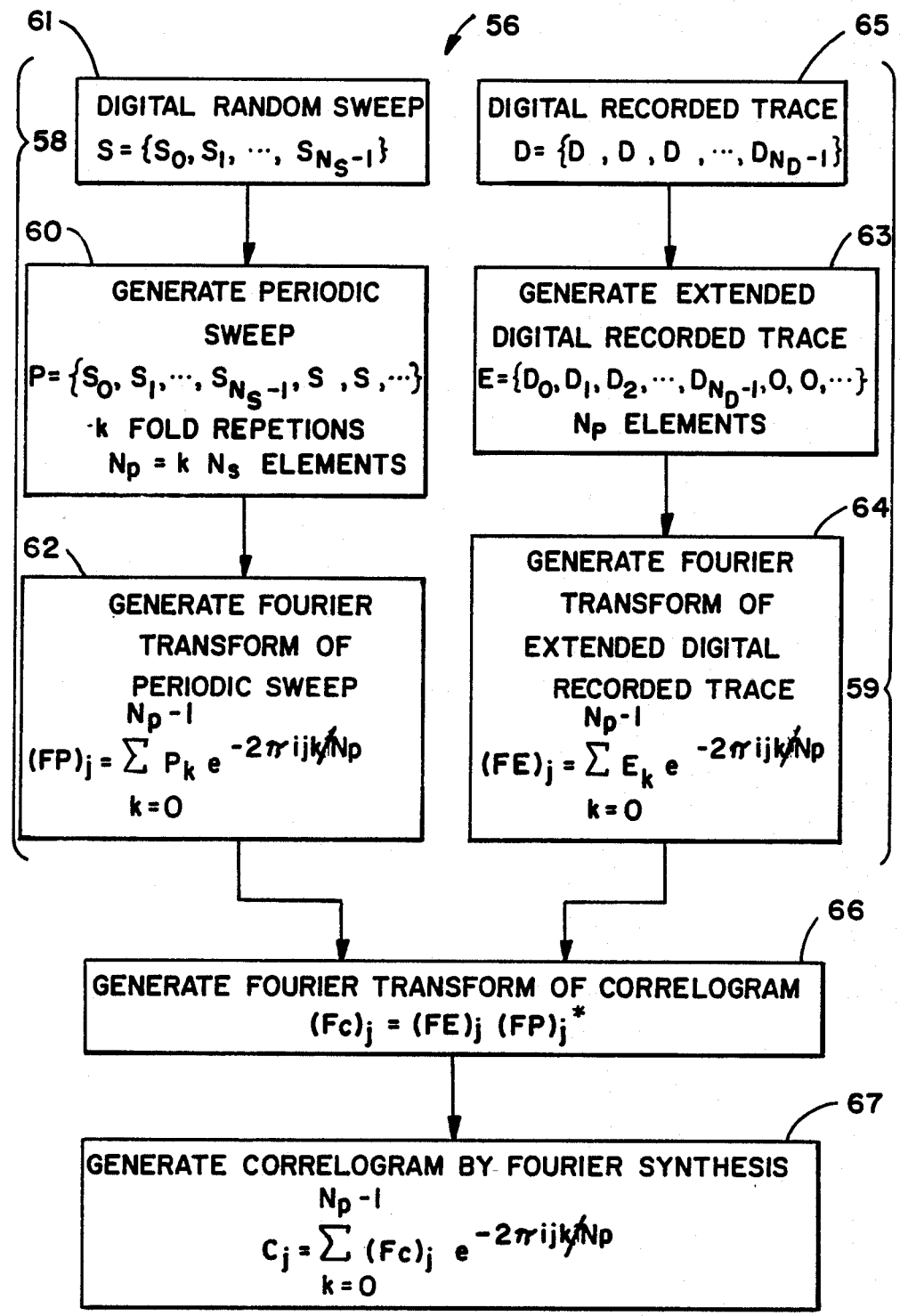
FIG _ 8

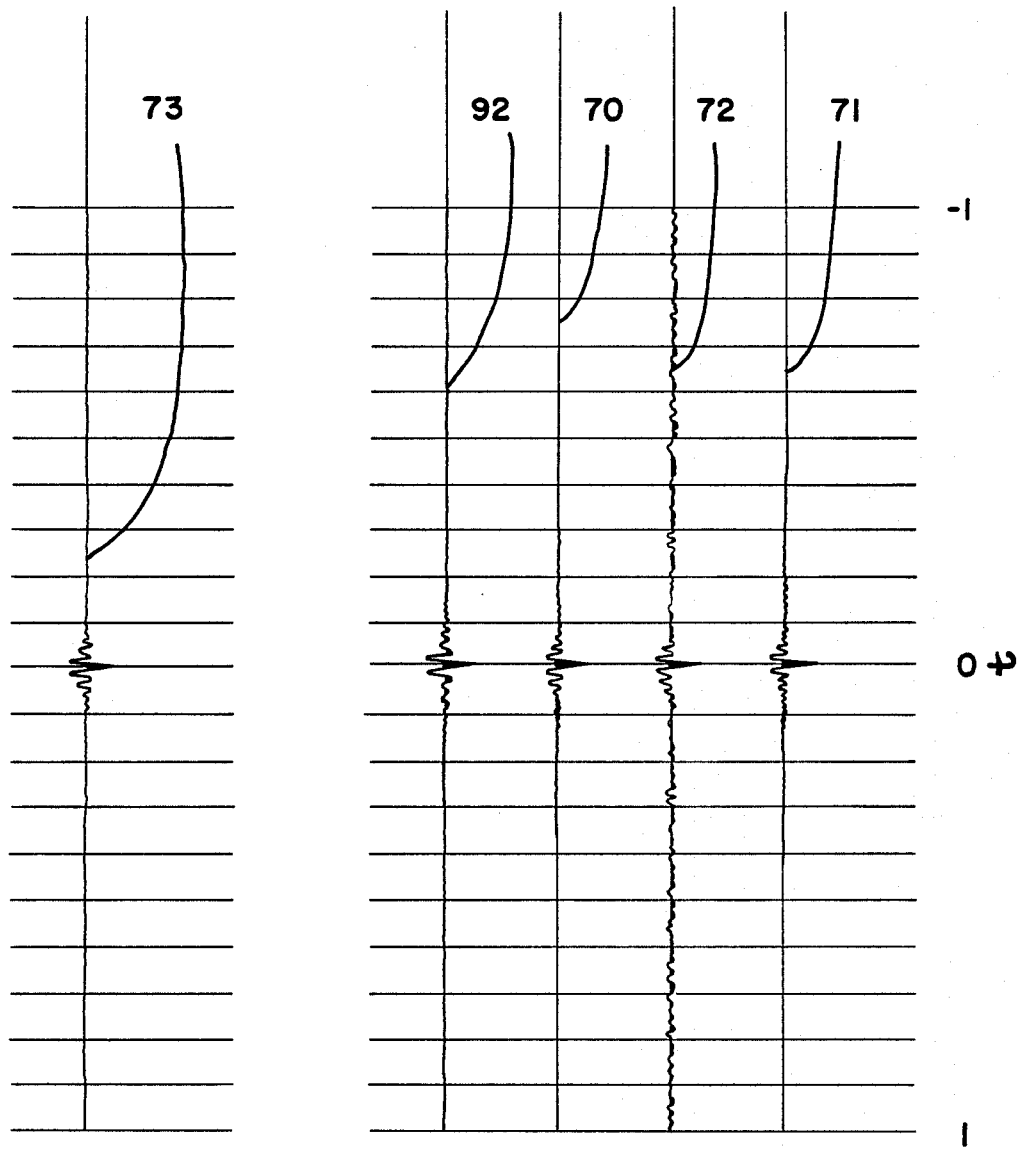
FIG _ 9

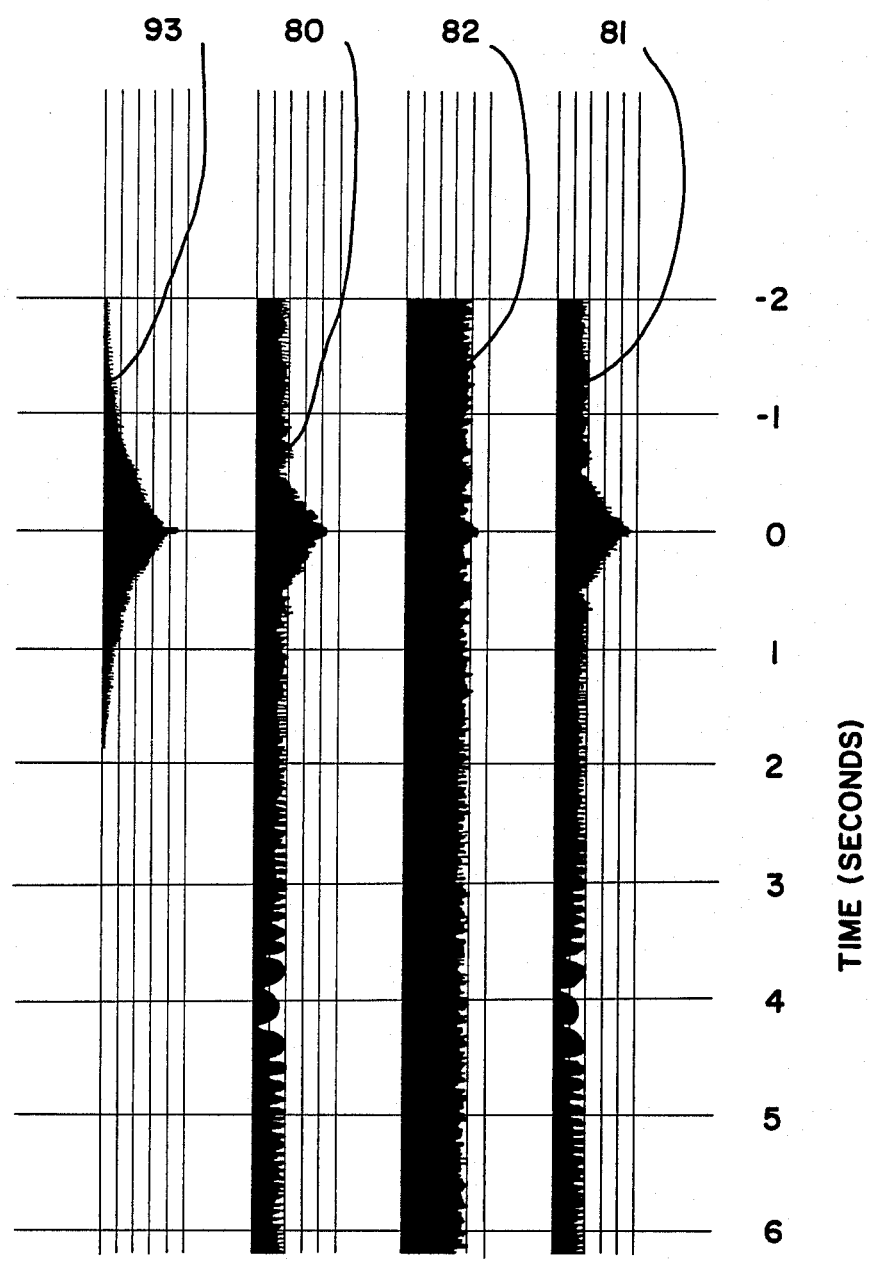
FIG _ 10

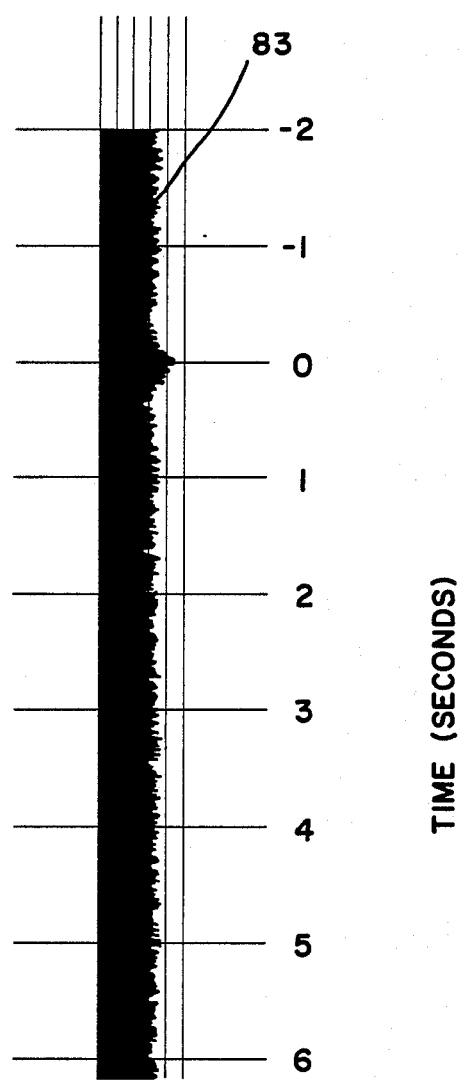
FIG _ 11

METHOD FOR GENERATING AND COLLECTING RANDOM VIBRATORY SEISMIC DATA WHEREIN A PRE-SPECIFIED WAVELET OF MINIMUM SIDE LOBE CONTENT IS ALWAYS PRODUCED IN THE FINAL CORRELATIONS BY MAINTAINING DOMAIN CONSISTENCY

SCOPE OF THE INVENTION

The present invention relates to seismic exploration in which seismic vibrations generated by one or more non-impulsive vibratory sources, are injected into the earth, and subsequent reflections are by recorded by a series of detectors at locations displaced from the source. More particularly, the invention relates to constructing a digital random control code essentially in the frequency domain from a pre-specified imbedded amplitude versus time wavelet of minimum side lobe content and then using such code for driving such vibrators so as to produce final seismic records by cross-correlation in which domain consistency is maintained. In a further aspect, the present invention has the further surprisingly capability of being able to indicate accumulations of oil and gas, even though such accumulations underlay urbanized areas and are subject to cultural noise, or where such accumulations are located in stratigraphic traps.

FIELD OF THE INVENTION

The terms "non-impulsive vibrators" and "non-impulsive vibratory systems" refers to the VIBROSEIS ® system of Continental Oil Company as set forth, for example, in Doty et al, U.S. Pat. No. 2,688,124, Aug. 31, 1954 for "Method and Apparatus For Determining Travel Time of Signals". In such a system, seismic waves are generated by mechanical vibrators on the earth's surface. Each of the vibrators is firmly anchored to the earth by the combined weight of the source. Peak forces in the neighborhood of 10 to 20 tons (and up to 36 tons) can be developed by the rapid, non-explosive interaction of the base-plate and piston system of each vibrator. Consequently, the weight of each vibrator is proportionally large to maintain the desired, continuous vibrator-earth contact during operations. The waves sent into the earth consist of long, sinusoidal wave trains of predetermined frequency and time duration characteristics rather than the much sharper wave impulses sent into the earth by the explosive sources used prior to the VIBROSEIS ® system, or by "weight drop" methods including those provided by various impulse-coded systems, e.g., the so-called "pulse-coded" techniques.

There may be some confusion as to the differences of the signals produced by the VIBROSEIS ® system and those produced by impulsive sources such as provided by exploding dynamite, exploding mixtures of propane and air, or by "weight drop" methods, including pulse-coded techniques.

It is well known that the capacity of any signal (including seismic signals) to carry information can be measured in a manner analogous to determining the volume of a container. Since volume is the product of height times width times length; similarly, information capacity of a signal is related to a product of amplitude, frequency bandwidth and the length of the signal.

Dynamite as a seismic energy source produces an input signal having considerable amplitude (height) and bandwidth, but has very short length. On the other hand, "non-impulsive" vibrations generated in the manner of a VIBROSEIS ® system have limited amplitude, but such is compensated for by the long length of the input signal and a faithful, continuous reproduction of the control signal over the frequency spectrum of interest. That is to say, in the VIBROSEIS ® system, the amplitude and phase spectra are carefully and continuously controlled so that the resulting energy spectra changes smoothly as a function of time. Thus, a smoothly varying output of desired frequency and duration characteristics is provided in contra-distinction to the binary-coded (ON-OFF) square wave output generated by pulse-coded methods in which the energy-per-blow is substantially constant and cannot be so controlled.

A further essential part of the VIBROSEIS ® system lies in the processing of the received data to produce records that tend to show short pulses called the imbedded wavelet representing reflections from subsurface interfaces. Such responses are provided by cross-correlating the recorded representation of the vibratory waves sent into the ground with the recorded representation of the waves received subsequently to provide a record called a correlogram.

BACKGROUND OF THE INVENTION

In F. Muir's U.S. Pat. No. 4,601,022 for "SEISMIC EXPLORATION USING NON-IMPULSIVE VIBRATORY SOURCES ACTIVATED BY ... AND PROCESSING THE RESULTS IN DISTORTION-FREE FINAL RECORDS PARTICULARLY USEFUL IN URBAN AREAS" and U.S. Pat. No. 4,486,866 for "SEISMIC EXPLORATION USING NON-IMPULSIVE ... AND PROCESSING THE RESULTS IN DISTORTION-FREE FINAL RECORDS PARTICULARLY USEFUL IN STRATIGRAPHIC TRAP DETERMINATION", assigned to the assignee of the present application, non-impulsive vibratory systems were described for use in particular exploration situations. The particular exploration circumstances addressed by the patentee, include urban areas and stratigraphic trap determination in which the vibrators were drives by a digital random code characterized as Gausian, zero-mean and stationary.

However, since the code for vibrator control is derived from a finite series of numbers, the resulting auto-correlations after the generated vibrations were generated, collected and processed, sometimes could have high side lobe content. Such an disadvantage would limit usefulness of the technique in certain exploration situations, say where deep targets were of interest. While I now know that increasing the length of the numerical sequence in combination with correct correlation would reduce the side lobe problem, that surprising solution would still have the drawback of unduly elongating the total time required for data gathering. Then other collection disadvantages could become of importance, e.g., there can be an increase in the likelihood of contamination of the resulting traces by cultural noise.

In U.S. Pat. No. 4,168,485, K. E. Waters et al, the patentees describe generation and use of digital and analog random sweeps under a particular set of circumstances to solve a special problem, viz., where two of more adjacently located seismic lines are being simultaneously recorded so that cross-contamination of the data exists. In the patentees' method, separate control codes for driving the vibrators to generate vibrations in the earth, were independently derived. But while the amplitude spectrums of both codes were the same, their phases were random. Hence the final correlograms of each line could be separated one from the other after processing. Although the patentees generated such codes from a finite series of random numbers, they did so without pre-specifying the shape of the autocorrelation and without identifying the correct mode of correlation that such pre-specification and subsequent construction, requires. It is the latter parameters that I have discovered to be of importance. Since the autocorrelation of any random sequence always is accompanied by high side lobe content absent the presence of the latter two conditions, the method in accordance with the patentees still leads to poor resolution in the case of many exploration targets of interest. The term "low side lobe content" means the correlation amplitudes die away rapidly, from the zero lag value and then level increases are minimal.

In his book "REFLECTION SEISMOLOGY", K. E. Waters further comments on the generation of digital and analog random sweeps in both particular and general circumstances in more critical fashion. He concludes that such sweeps are not compatible with conventional vibrator operations due to inefficient energy generation. Also after processing, side lobe content of associated autocorrelations can be high, necessitating the use of side lobe suppression techniques, as previously described.

SUMMARY OF THE INVENTION

In accordance with present invention, the above-listed deficiencies in random sweeps for vibrator sources in the collection of seismic data using conventional collection techniques say common center point (CCP) methods, are overcome by (i) pre-specifying the shape of the autocorrelation as an amplitude and time, imbedded wavelet of merit so that the latter is compatible with earth transmissibility and vibrator response requirements, (ii) constructing a digital control code for the vibratory sources essentially in the frequency domain (FD) using, inter alia, the FD representations of the last-mentioned pre-specified autocorrelation, and (iii) cross-correlating the reflected waves received at the earth's surface (after inverse transformation of the frequency domain representations and system activation), using differing extension techniques for the code (or representations thereof) and the received data to maintain domain consistency.

In operations, the magnitude of base plate pressure of the vibratory source (or sources) against the earth as a function of time, is controlled by the constructed digital code set forth in item (ii), supra. The resulting vibratory waves then propagate through the earth in a random, displacement-time waveform compatible with earth transmissibility and vibrator response requirements. Yet the vibratory output of the driven vibrators possess desirable random power versus frequency characteristics useful in the circumstances set forth in the Muir patents, op. cit. After the vibrations are reflected from targets in the earth and collected at a series of detector along the line of survey, the resulting trace records are next cross correlated with digital control code in a mode truly compatible with parameters inherent in FD code construction. viz., the fact that a wavelet of merit is pre-specified and that Fourier formulae are used to calculate representatives of that autocorrelation, in the frequency domain.

During correlation, FD construction of the digital control code, can taint the resulting correlograms unless the extension techniques of item (iii), supra, are employed. In this regard, it has been surprisingly found that the control code (or representative thereof) must be extended periodically prior to cross-correlation by periodic replication and not by padding the ends by zeros as previously done. Reason: in conventional CCP exploration systems where correlation is performed in the frequency domain, current correlators use conventional computer hierarchy normalized to a base of 2, i.e., a radix of 2. The frequency sampling interval of the control code as correlation with trace record occurs, becomes a function of that radix times the sweep length. Hence during correlation in the frequency domain, the frequency sampling interval is half the sampling interval used to construct the control code. Result: the extra samples needed to be filled by interpolation of its Fourier transform do not maintain proper amplitude spectrum integrity under such conditions unless the control code is extended as taught in the instant invention. However, the trace records are still extended to a normalized sample length, viz., be a value equal to k-fold value of the digital code, via zero padding.

With further regard to item (iii), supra, note that since the present invention employs the FD representations of the autocorrelation as a pre-specified imbedded signal of merit, domain consistency demands that the Fourier formulas that convert such code during correlation have infinite repetition in the negative and positive time directions. This is provided in accordance with the present invention, only by extending the control code in positive and negative directions using periodic repetition. Note that the trace record is extended in conventional fashion.

Result: not only are vibrator and earth response requirements for maximizing generation efficiency met along with the generation of desirable power versus frequency characteristics, but also the resulting final cross correlations have suprisingly low side lobe content. Hence, neither are events associated with deep events in the resulting correlograms, nor are shallow events temporarily close together obscured. As a further result of the low side low content in the correlograms, previously used methods in association with random collection, for improving signal-to-noise ratios of the events of interest, become unnecessary, viz., vibrating many different random sweeps at a single source point, correlating each profile and then stacking the common traces. Also scaling techniques such as the diversity stacking technique described by Waters, op. cit., (of great utility in culturally noisy environments), can be used. Such scaling processing had been precluded when the interpreter had to include conventional side lobe suppression as previously described.

In operations, the phase spectrum of the digital code is preferably random while the length of the code is equal to that used in conventional CCP generation of seismic data. The code itself consists of a finite series of random numbers, encoded on a E-PROM at the input of a conventional digital control circuit. Since the E-PROM can be integrated on an iterative basis the vibratory sources moving from sourcepoint-to-sourcepoint along a line of survey, can be driven in a random but repetitive manner, i.e., be redundance from source point to source point along the line of survey. Thus, in accordance with this invention, the record traces associated with a common center point can be scaled before they are stacked as is common in the diversity stacking technique described above. That is, after the traces are scaled to eliminate cultural noise, the gathered traces can be stacked and the stacked trace is periodic sweep correlated with the control code in the manner of the present invention.

In constructing the digital code, its amplitude envelope is preferably constant. But note that the amplitude of the analog representations of the digital code (called in the sweep) can also be said to be random since its magnitude is directly related to a particular randomized phase spectrum provided. The duality of the relationship between amplitude and phase thus must be recognized. Since the digital code is usually easily converted to a continuous alternating sweep signal, compatibility with control circuits used in conventional vibratory explorations systems, is assured.

In accordance with a more detailed aspect, the present invention for constructing the random control code, employs the following steps, viz.:

(a) after pre-specifying a finite, digital autocorrelation of merit, Ak, of minimum side lobe content and of compatible earth transmissibility and vibrator system response characteristics in the time domain, converting the pre-specified autocorrelation into frequency domain representations including its power spectrum, pj, by multiplying the real and complex conjugates of its Fourier transform representations in accordance with $$pj = Pj \, Pj^*$$

where the sequence pj is the square of the amplitude-frequency response of the autocorrelation equal to the Fourier transform of the autocorrelation, Ak, in the equation $$Pj = \sum_{k=0}^{N-1} A_k e^{-2\pi i j k / N};$$

Pj* is the complexed conjugate, i.e., wherein the sign of the imaginary part is reversed; j is summation index defined by $0 \leq j \leq N-1$, being the number of samples in the random control code to be constructed, and k is the component index defined by $0 \leq k \leq N-1$;

(b) generating the amplitude spectrum of the control code in the frequency domain in accordance with $$aj = \sqrt{pj} \quad 0 \leq j \leq N - 1$$

(c) generating the phase spectrum of the control code in in the frequency domain in accordance with $$\phi j = 2\pi n j \quad 0 \leq n j \leq +/- 1 \text{ where}$$

nj is any random, normalized sequence of numbers, say normalized between $-1$ and $+1$;

(d) constructing the control code, dj, by inverse Fourier transformation of the amplitude and phase spectra of steps (b) and (c) in accordance with $$dj = \sum_{k=0}^{N-1} a_k e^{i\phi_k} e^{2\pi i j k / N}.$$

In a further detail of the method aspects of the invention that relate to how sweep and trace records (after activation of the sources) are extended to provide periodic sweep correlation, the following is of importance.

In brief, the purpose of periodic sweep (PS) correlation is to assure that the imbedded wavelet in any final correlogram is in fact the autocorrelation of merit used in the initial design. Hence after the digital control code of the present invention has been employed to drive the vibrator and the reflections have been recorded, the resulting correlograms produced in association with the drive code (or its representation) provide a surprising resemblance to the original wavelet. Certain digital recording and correlation parameters are of importance in this regard and deserve further definition. For example, the correlograms each have a common length in time that is equal to dimension t1 related to the total temporal time of the field record, to, and length of the control code ts. I.e., the record length, to, is equal to the sum of length of the control code ts and the listen time tl. Additionally, the sampling interval of $\Delta t$ during seismic exploration in the field produces a digital seismic record defined by $$D = \{D_0, D_1, \ldots D_{ND-1}\}$$

where $t_0 = (N_D - 1)\Delta t$. Furthermore, the digital correlogram is defined by $$C = \{C_0, C_1, \ldots, C_{Nl-1}\}$$

where $t_l = (N_l - 1)\Delta t$. Still further the digital control code is defined by $$S = \{S_0, S_1, \ldots, S_{Ns-1}\}$$

where $t_s = (N_s - 1)\Delta t$.

With the above parameters in mind, the present invention is then used in the following manner, viz.:

(i) constructing a different periodic sweep for correlation purposes, such periodic sweep being a k fold repetition of the original digital random control code S. I.e. the periodic sweep is produced in accordance with $$P = \{S_0, S_1, \ldots, S_{Ns-1}, S_0, S_1, \ldots\} \text{ where } N_p = k \, N_s;$$

(ii) extending record length by padding the end of the record with zeros. I.e., the construction of the extended record is in accordance with $$E = \{D_0, D_1, \ldots, D_{ND-1}, 0, 0, \ldots\} N_E = N_p = k \, N_s;$$

(iii) then essentially permitting conventional correlation to occur. But because the correct parameters of the periodic sweep are always specified, the imbedded wavelet is now the autocorrelation of merit in each correlogram.

DEFINITIONS

The terms "digital random sweep code"; "pre-specified wavelet of minimum side lobe content" and "periodic sweep correlation" all relate to particular aspects of the prevent invention, and have particular meanings requiring detailed definitions.

A "digital random sweep code" consist of a sequence of random numbers used as a drive code for the vibrator. In general such a random sequence has both a random amplitude spectrum and a random phase spectrum. Usually the amplitude spectrum is limited to some range of frequencies wherein amplitudes outside the range are zero. Random phase sweep codes are random sweeps whose amplitude spectra are smooth and non-random, but whose phase spectra are random. The latter is desirable because the wavelet imbedded in the resulting correlogram is solely determined by the amplitude spectrum of the sweep code, and desirable imbedded wavelets correspond to smooth, non-random amplitude spectra. The relation is that the imbedded wavelet is the autocorrelation of the sweep. The amplitude spectrum of the imbedded wavelet is thus the square of the amplitude spectrum of the sweep, and the phase spectrum of the imbedded wavelet is zero regardless of the phase spectrum of the sweep. Thus, in the present invention for random phase sweep codes, the amplitude spectrum specifies the imbedded wavelet and the phase spectrum causes the sweep to be random.

One desirable property that an imbedded wavelet should possess if the correlogram is to be useful for oil and gas exploration is that it be of short temporal duration so that reflections that occur close together in time on the correlogram may be resolved, i.e., where the amplitude falls off rapidly from a central peak. Such a wavelet is thus efficacious in resolving events close together on a correlogram. However, the amplitude may not go to zero at times far from the central peak. The resulting side lobes can greatly degrade a correlogram. Reason: the energy at the beginning of a correlogram may be orders of magnitude larger than that of the deep reflectors. Hence, even if the side lobes of the first energy are small compared to the central peak of the first energy, these side lobes may be larger than the central peaks of the deep reflectors. Thus, very small side lobe content is a second desirable property of the imbedded wavelet and one that random sweeps of which I am aware, lack.

The present invention describes a process for constructing a correlogram which has an imbedded wavelet possessing these desirable properties. As previously indicated, the invention starts with predetermined wavelet possessing the desirable properties, called the autocorrelation of merit, which is to be imbedded in the data. A random phase sweep is constructed in the frequency domain from this autocorrelation of merit whereby the amplitude spectrum of the sweep code is the square root of the amplitude spectrum of the autocorrelation of merit and the phase spectrum of the sweep is a random sequence. The correlogram is constructed by a process called periodic sweep code correlation wherein the extended recorded data is correlated with an extended periodic sweep code which is a k-fold replication of the original random phase sweep.

The terms "urban area" or "urbanized area" likewise require definition. These terms are used herein in their broadest sense: areas at the earth's surface where human activities of a non-rural nature predominate. Further characteristics of urban areas are: complexed transportation, residential and business systems that include standing streets, sidewalks, homes and business buildings whose construction is subject to governmental control through operations of statutes; and business activities within such areas which are also subject to similar laws promulgated by governmental agencies. With respect to seismic prospecting within such areas, typically the statutes require that the operator obey laws and/or ordinances dealing with noise limits to avoid inflicting undue stress upon the populace and avoid activities that produce too much seismic energy output that could damage structures in the exploration areas. A particular agency limits exploration activities through issuance (or denial) of exploration permits within a given area under that agency's jurisdiction.

Since oil and gas accumulations within such areas are often difficult to discover, mapping of such structures by conventional non-impulsive sources where output and/or signal duration have been governmentally limited, is extremely difficult to achieve.

Such governmental agencies not only can limit the maximum signal output (usually in decibels) but the characteristics of the signal themselves may also be limited to given frequencies which do not damage man-made structures. Likewise, activities within the urban area can also effect the nature of the collected signals in an adverse way; for example, an auto can pass close by the detector array during collection and cause a cultural noise burst which will adversely affect final results (even though redundancy techniques are used).

The terms "stratigraphic accumulations" and "stratigraphic traps" are used herein in their broadest sense: traps that do not rely on structural or tectonic processes to bring about closure The relevant process must therefore involve changes in the permeability and porosity of the host sediments, either by sedimentation or by metamorphic processes, say (1) silting of a sandstone body until the pore spaces are insufficiently large to allow the escape of the hydrocarbons; and (2) action of magnesium-bearing salts of, say, groundwater on limestone causing the transformation of the latter to dolomite which have a lower porosity than that of calcite again prevents the escape of the oil and gas.

Since such traps are not usually associated with large acoustic contrasts, mapping by conventional methods (such as by measuring changes in the arrival time of the associated reflection) cannot be done. Hence, indirect analytical methods are required. For example, time differences and changes in reflection wave shapes of traces associated with the interval of interest, are most often used, but with limited success due, inter alia, to the fact that resolution requires that the compared traces be essentially distortion-free, after processing has occurred.

These and other features and advantages of the present invention will become evident to exploration seismologists in light of the following specification, including the appended drawings briefly described here.

BRIEF DESCRIPTION OF THE DRAWINGS

FIG. 2 is a correlogram constructed by conventional linear correlation for traces associated with a split-spread of detectors, the traces resulting from the reception of vibrations injected into the earth from a single vibratory source driven by a conventional analog linear sweep;

FIG. 3 is a correlogram constructed by conventional linear correlation for traces associated with a split-spread of detectors, the traces resulting from the reception of vibrations injected into the earth from a single vibratory source driven by a digital random sweep code constructed in accordance with the present invention;

FIG. 4 is a correlogram constructed by periodic sweep code correlation of the present invention for traces associated with a split-spread of detectors, the traces resulting from the reception of vibrations injected into the earth from a single vibratory source driven by a digital random sweep code constructed in accordance with the method of the invention;

FIG. 5 is a flow chart for generating the digital random sweep code of FIG. 4;

FIG. 6 is a series of amplitude v. time representations of the different sweeps useful in illustrating the advantages of the present invention, viz., wherein representations of the digital sweep code construed by the method of the present invention are also depicted side-by-side therewith;

FIG. 7 are the amplitude spectra of the sweeps of FIG. 6;

FIG. 8 is a flow chart for providing peric,dic sweep code correlation in accordance with the present invention:

FIG. 9 are autocorrelations of the sweeps of FIG. 6 illustrating the advantages of the present invention, viz., wherein autocorrelations of the digital sweep code of the present invention are correlated in both conventional and in improved fashion in accordance with the correlation aspects of the present invention and are presented side-by-side with the autocorrelations of the aforementioned series of sweeps of FIG. 6; and FIGS. 10 and 11 are rectified dB plots of the autocorrelations of FIG. 9.

DETAILED DESCRIPTION OF THE INVENTION

Figure 1:
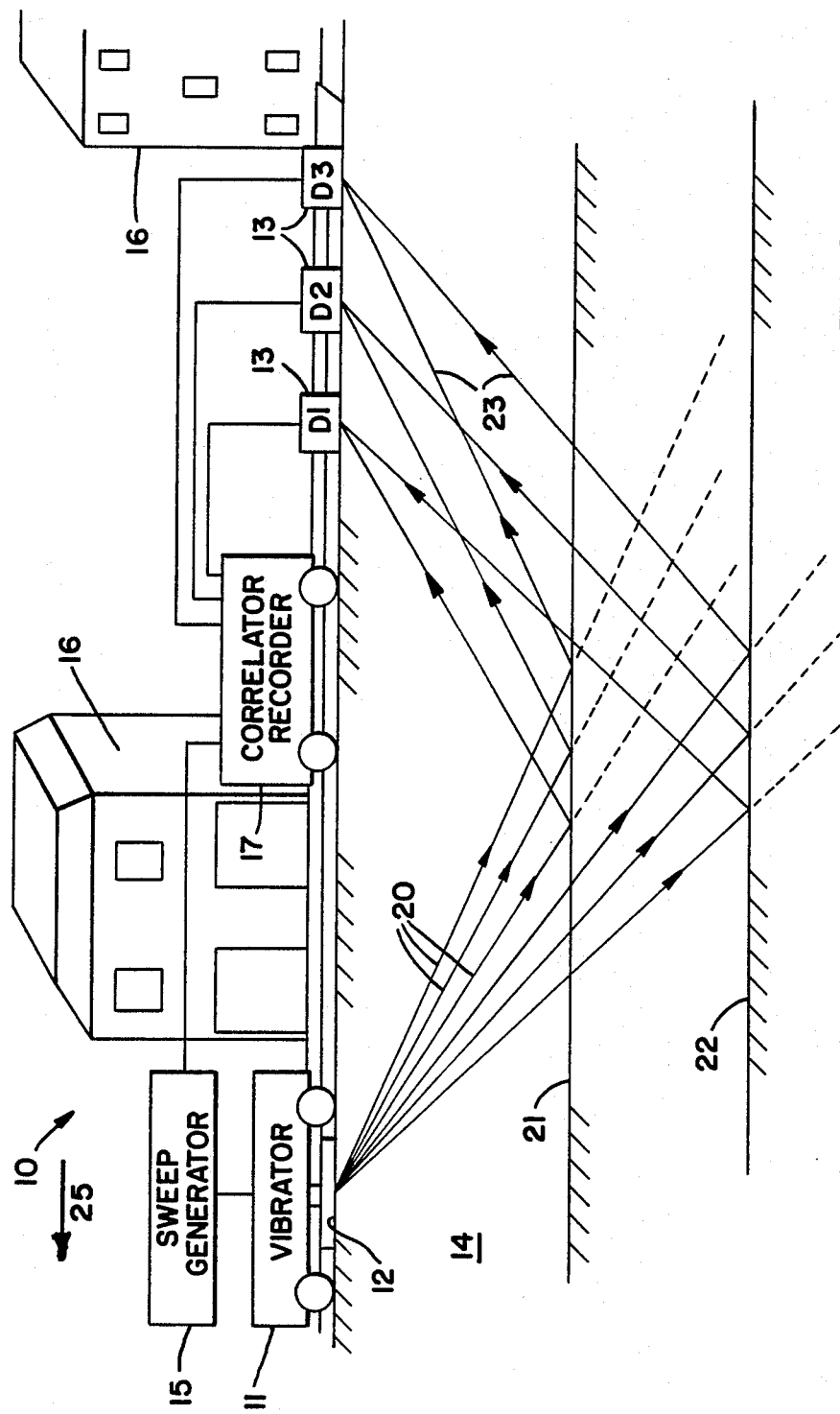
FIG. 1 is a side elevation of an earth formation in an urban area, and shows major pieces of apparatus used in a survey system for carrying out the present invention, the survey system including a vibratory source adapted to be driven by a random phase code, a series of detectors arranged to receive the propagated portions of the injected vibrations, and processing and recording means for the generated and recorded signals.

Refer now to FIG. 1, 10 illustrates the survey system of the present invention in an urban area. System 10 includes vibratory source 11 positioned on a street 12 at a location distant from a series of detectors 13. In operation, vibratory source 11 injects seismic vibrations in a continuous and non-impulsive manner into the earth formation 14 in a manner that does not inflict damage upon humans or to adjacent buildings 16. Amplitude-versus-time characteristics of the vibrations of the source 11 vary over a predetermined time frequency spectrum, under control of a random phase control code in residence within digital sweep conditioning circuit 15. Within the conditioning circuit 15 are a digital encoder such as a E-PROM on which the digital random numbers are encoded, a timing and control circuit for reading the encoded numbers in sequence, a digital-to-analog convertor and a optional filter (all not shown). The series of random numbers recorded on E-PROM are capable of being individually accessed in digital signal format (as a voltage or current) from the E-PROM through the convertor and filter to produce an alternating signal for driving the vibratory source 11 in conventional fashion. The conditioning circuit 15 is available from the Pleton Research and Technology Company, Ponca City, Oklahoma. Usually, after a digital control code has been constructed, the output of either individual elements of the circuit 15 or the circuit 15 itself, may have to be scaled so that the vibratory source 11 is operating within displacement limits. Note that while the digital control code can be constructed in the field using a field computer and placed in a suitable form in the driver 15, preferably that operation occurs at a more remote location using a conventional computer system to encode the digital code onto the suitable recording medium such as the E-PROM previously mentioned. Since the invention provides for a digital control code that can be bandwidth limited to conform with propagation characteristics of the earth formation 14 and the operating parameters of the vibratory source 11 as explained below, the filter within the conditioning circuit 15 is usually inactivated and the digital code is fed directly through a separate information channel (not shown) to processing and recording unit 17.

In FIG. 1 the vibratory waves going into earth formation 14 are represented by ray paths 20, the waves traveling obliquely downward toward a pair of stratal interfaces 21, 22 where they undergo partial reflection and travel back upwards along paths 23, again obliquely, toward the series of detectors 13 at the earth's surface. While only three symbolic detectors are shown in FIG. 1, in actual current field practice, hundreds of detectors may be employed.

Additionally, the source 11 may consist of several vibrators operating as a unit about a source point SP aligned along a line of survey 24. Both the source 11 and the detectors 13 can undergo incremental movement in the direction of arrow 25 in a conventional manner that permits selected areas of the interfaces 21, 22 to be sampled on a redundant basis. That is to say, the reflections detected at the detectors 13 can be normalized to center points midway between the source point SP and each detector 13, and then such center points can be made to common to more than source-detector pair as is conventional in common center point (CCP) collection techniques. After being detected at detectors as a function of detector location or representative location thereof, the data is transmitted to processing and recording circuit 17. In the circuit 17, an improved form of cross-correlation is performed as explained in more detail below, but wherein present cross-correlation circuitry available in the field is used.

Reference is now made to FIGS. 2, 3 and 4 illustrating recordings 30, 31 and 32 generated using a source 11 driven by a conventional linear sweep (FIG. 2); by a random phase digital code constructed in accordance with one aspect of the invention (FIG. 3) but having detected results processed using convention linear cross-correlation; and by a similar random phase digital code (FIG. 4) but in which the detected signals are processed in accordance with another aspect of the present invention, viz., using periodic sweep correlation. In each case, collection was similar. The vibratory source 11 operated at a much hiqher drive level for the linear sweep than for the random phase sweep using detectors at similar locations along the same line of survey. The split spread recording was obtained by placing the vibratory source between two receiver spreads to provide the show of gathers to recordings 30, 31, 32. Normal recording parameters were used. The sweep was limited to a bandwidth of 8 to 48 Hz. 120 channels of split spread data was recorded and processed. The sampling rate was 4 milliseconds. The recorded trace length: 5 seconds. Correlation can take place in the field.

As shown, the recording 32 of FIG. 4 in accordance with the present invention is superior to the conventional recording 30 of FIG. 2. In a sense, such a comparison is biased against the method in accordance with the present invention since the drive level of the conventional linear sweep was larger. Even so, note there is a distinct absence of ground roll in recording 32. At about 1.5 seconds, event 33 of recording 32 is obscured on the conventional recording 30. Also the first breaks 34 of recording 32 appear crisper and less ringy.

The surprisingly superior results due proper correlation procedures are illustrated by comparing recordings 31 and 32. In recording 31 conventional linear cross correlation was used in which end of the code (for frequency domain correlation) were padded with zeros while in recording 32 correlation in accordance with present invention was carried wherein there is a complete absence of zero padding. Note in recording 31 the build-up of side lobes in region 35, and the complete suppression of such build-up in recording 32.

While the appearance of superiority is evident in the figures, seismologists in general must also be aware of the theory and physical steps of operations.

OPERATIONAL STEPS FOR CONSTRUCTING THE CONTROL CODE

In accordance with the present invention, the random phase control code can be constructed using a conventional digital computer properly programmed to provide the following steps:

(a) after pre-specifying a finite, digital autocorrelation of merit, Ak, of minimum side lobe content and of compatible earth transmissibility and vibrator system response characteristics in the time domain, converting the pre-specified autocorrelation into frequency domain representations including its power spectrum, pj, by multiplying the real and complex conjugates of its Fourier transform representations in the equation $$Pj = pj\ pj^*$$

where the sequence Pj is the square of the amplitude-frequency response of the autocorrelation equal to the Fourier transform of the autocorrelation, Ak, in the equation $$pj = \sum_{k=0}^{N-1} A_k e^{-2\pi i jk/N};$$

pj* is the complexed conjugate, i.e., wherein the sign of the imaginary part is reversed; j is summation index defined by $0 < k < N-1$, N being the number of samples in the random control code to be constructed, and k is the component index defined by $0 < j < N-1$;

(b) generating the amplitude spectrum of the control code in the frequency domain in accordance with $$aj = \sqrt{Pj} \quad 0 \leq j \leq N - 1$$

(c) generating the phase spectrum of the control code in in the frequency domain in accordance with $$\phi j = 2\pi nj \quad 0 < j < N-1 \text{ where}$$

nj is any random, normalized sequence of numbers, say normalized between $-1$ and $+1$;

(d) constructing the control code, dj, by inverse Fourier transformation of the amplitude and phase spectra of steps (b) and (c) in accordance with $$dj = \sum_{k=0}^{N-1} A_k e^{i\phi_k} e^{2\pi i jk/N}.$$

Thereafter the control code is employed to carefully control the one or more vibrators of the CCP exploration system in the manner previously described, viz. to control the magnitude of pressure of their base plates against the earth as a function of time in a repetitive but known random manner so that the resulting vibrations generated for propagation through the earth by the driven vibrators are compatible with earth transmissibility and vibrator response requirements and redundant from source point to source point along the line of survey. Yet the vibratory output of the driven vibrators possess desirable random power versus frequency characteristics useful in the circumstances set forth in the Muir patents, op. cit.

FIG. 5 illustrates the steps (a)–(d) supra in more detail as construction of the random phase control code of the invention, occurs.

As previously mentioned, the control code in the present invention can be constructed using a main frame computer properly programmed to carry out the above steps. But advances in the area of software, firmware and hardware are occurring so rapidly that an explorationists can if he chooses, carry out such construction in the field. In some cases, the latter may be preferred.

The discussion which follows will examine the steps of FIG. 5 one by one including an examination of possible options in preparing the code.

At 40, the designer provides an autocorrelation of merit wj by several available methods, one of which using the conventional "chirp" or linear sweep conventional in the art. For example, the usual form of the sweep is:

$$F(t) = A(t)\sin 2\pi \left[ at + \frac{bt^2}{2} \right]$$

$$(0 < t < T)$$

where the signal consists of a sinusoidal function of gradually and uniformly increasing frequency, starting at $w_o = 2\pi a$ ($f_o = a$) and ending at $w_f = 2\pi(a+bT)$. Thus, a sweep going from 10 to 100 Hz in 16 seconds has values of $a=10$ and $b=5.6$. The purpose of the function A(t) is to have a multiplying factor in the sinusoidal function so that the sweep does not start or stop abruptly in amplitude.

In an urban area, the usual permitting process would limit the drive level to a maximum value $F_m(t)$ with, in addition, certain frequency ranges being omitted because of possible resonance effects. But since the latter condition is not limiting in the method of the present invention (the random code spreads the energy of each frequency component evenly), the code can be used in full frequency ensemble. Man-made structures are less likely to vibrate at dangerously high levels than when the latter are subject to conventional "chirp" signals, that is, where the energy of particular frequencies is concentrated and localized in time.

Next, the autocorrelation of the constructed sweep is determined by Fourier transformation to obtain the power spectrum of the sweep in the frequency domain followed by inverse transformation to generate the auto-correlation of merit, wj, in amplitude versus time dimensions. Such calculations are easily carried out on a properly programmed digital computer as conventional in the art. The index j for the operation is between zero and Ns where Ns is number of points in the sweep indicating only the positive half of the autocorrelation is generated. In this regard, a 2 millisecond sample rate is common.

Then, at 41, the autocorrelation, wj, undergoes Fourier transformation employing the usual formulas which convert the amplitude versus time autocorrelation into its frequency domain representations in accordance with:-

$$Wj = \sum_{k=0}^{N_s-1} wje^{-2\pi ijk/N_s}.$$

At 42, continuing in the frequency domain, the amplitude spectrum of the Fourier representations of 41 are generated in accordance with:

$$aj = \sqrt{WjWd^*}.$$

Simultaneously with or pre- or post-operative to the steps of 40,41 and 42, other steps at 44 and 45 can be carried out. These steps deal with generation of a random phase spectrum. At 44, for example, a set of random numbers, say 500 per second for a preselected time determined by the index number j between minimum phase (although zero phase may be satisfactory) and Ns, previously defined as the number of sample points in the sweep, is produced using a well-known subroutine in the IBM Scientific Subroutine Package, viz., RANDU. But other techniques can be satisfactory in this regard. For example, sets of random numbers could be generated as discussed by Lewis in the IBM System Journal No. 2 (1969) and by Knuth in his book "Seminumerical Algorithms "(Vol. 2 of "ART OF COMPUTER PROGRAMMING", Addison Wesley Pub. Co.). Amplitudes are scaled between plus and minus one (+/−1).

Then at 45, the random phase spectrum is generated in accordance with $$\phi j = 2\pi Mj.$$

The latter is combined at 46 with the generated amplitude spectrum to produce the Fourier representatives of the random phase code in accordance with $$sj = aje^{i\phi j}.$$

At 47, inverse transformation of the Fourier representatives at 46, occurs. Result: generation of the digital time domain random phase code in accordance with $$Sj = \sum_{k=0}^{N_s-1} sje^{2\pi ijk/N_s}.$$

Advantages of the generated code at 47 in accordance with the present invention can be observed from an examination of FIGS. 6 and 7. In FIG. 6, the digital-to-analog representation of the code 47 which in this instance was computed by executing a FORTRAN program on an IBM 3033 mainframe, is depicted at 50 along with linear sweep ("chirp" ) at 51 and a conventional random sweep 52. Since the sweep 50 was constructed from linear sweep 51, the frequency domain amplitude spectra are identical as depicted in FIG. 7 at 53 and 54, but the amplitude versus time variations are markedly different as shown. Moreover, amplitude-time variations of sweep 50 are seen to match those of a conventional random sweep 52 in FIG. 6. Sweep 52 of FIG. 6 was generated by conventional methods as for example generated by conventional random number generators and D/A convertors as set forth in Waters et al., op cit., using RANDU to generate a set of uniformly random numbers, but without full use of of the teachings of the present invention. Result: a non-constant, ragged amplitude spectrum shown at 56 in FIG. 7. With further regard to the amplitude spectrum 56, note that the usual equipment used in geophysical prospecting systems in urban areas that I am familiar with use two to four millisecond sampling rates. Assuming a 32 second code at a two millisecond sampling rate, for example, would require the random number generator to provide 1600 random numbers for the generation of sweep 52.

OPERATIONS IN THE FIELD

Thereafter the exploration system of FIG. 1 is activated in an urban area. Assume code 47 of FIG. 4 has been encoded into memory of a conventional digital controller as previously describe and the system undergoes activation. Result: as previously indicated, vibrations are generated and propagate through the earth underlying the urban area. Thereafter, reflections are collected by the series of detectors and then those results are cross-correlated with the control code. Since the results are conventionally collected digitally, the correlation is usually carried out in the frequency domain. But such conventional correlation does not include steps which permit periodic sweep correlation in accordance with the present invention.

PERIODIC SWEEP CORRELATION

FIG. 8 illustrates periodic sweep (PS) correlation in detail.

In brief, the purpose of periodic sweep correlation is to assure that the imbedded wavelet in any final correlogram is in fact the autocorrelation of merit used in the initial design. Hence after the digital control code of the present invention has been employed to drive the vibrator and the reflections have been recorded, the resulting correlograms produced in association with the drive code (or its representation) provide a surprising resemblance to the original wavelet. Certain digital recording and correlation parameters are of importance in this regard and deserve further definition. For example, the correlograms each have a common length in time that is equal to dimension t1 related to the total temporal time of the field record, to, and length of the control code ts. I.e., the record length, to, is equal to the sum of length of the control code ts and the listen time t1. Additionally, the sampling interval of $\Delta t$ during seismic exploration in the field produces a digital seismic record defined by $$D = \{D_0, D_1, \ldots, D_{ND-1}\}$$

where $t_0 = (N_D - 1)\Delta t$. Furthermore, the digital correlogram is defined by $$C = \{C_0, C_1, \ldots, C_{Nl-1}\}$$

where $t_l = (N_l - 1)\Delta t$. Still further the digital control code is defined by $$S = \{S_0, S_1, \ldots, S_{N_s-1}\}$$

where $t_s = (N_s - 1)\Delta t$.

With the above parameters in mind, the present invention is then used in the following manner, viz.:

(i) extending the original random digital control code used to drive the vibratory source during collection, such extension providing the required periodic sweep for correlation, such correlation periodic sweep being a k fold repetition of the original random code S wherein the periodic sweep being is in accordance with $$P = \{S_0, S_1, \ldots, S_{N_s-1}, S_0, S_1, \ldots\} \text{ where } N_p = k N_s;$$

(ii) extending record length by padding the end of the record with zeros wherein the extension of the record is in accordance with $$E = \{D_0, D_1, \ldots, D_{ND-1}, 0, 0, \ldots\} N_E = N_p = k N_s;$$

(iii) then essentially permitting conventional correlation to occur using (i) and (ii), supra, but because the correct parameters of the periodic sweep are always specified, the imbedded wavelet is now the autocorrelation of merit in each resulting correlogram.

Returning to FIG. 8 for further details, note that the flow chart 56 includes a series of steps used within a properly programmed conventional field correlator (not shown) within the recording and processing circuit of FIG. 1. Purpose: to extend (i) the original digital drive code (used to control the vibratory source) to form the correct periodic sweep code compatible in subsequent correlation steps, and (ii) the collected digitized record traces themselves. The final lengths after extension must have commonality. That is, the normalized lengths amongst (i) and (ii) must be compatible with subsequent cross-correlation even though design of the original random digital code originated in the frequency domain. These steps can be independently occurring, however. That is, the steps associated with extension of the original random digital code identified with a process line 58, can be independent of the operations of line 59 related to the extension of the record traces. However, the products of each line 58 and 59 must be generated before actual correlation occurs as explained below.

Now in more detail as to line 58, note that digital code of record within 60 may have been scaled from the originally generated digital code for compatibility with the vibratory source of FIG. 1. Hence code cf 61 is identified by the letter S and is equal to $$\{S_0, S_1, \ldots, S_{N_s-1}\}.$$

Extension of the code in accordance with line 58 then begins at 61 where the elements comprising code S are extended in a periodic manner to form the required periodic sweep code needed for consistency in subsequent correlation steps. Such extension begins at sample point Ns-1 of the original code and is thereafter periodic in the manner set forth below:

$$P = \{S_0, S_1, \ldots, S_{N_s-1} S_0, S_1, \ldots\}.$$

Essentially, the resulting periodic sweep code is a k-fold repetition of the original digital random drive code of FIG. 1. It thus contains Np=kNs elements where k is a positive integer greater than one. As a result of such periodic extension, the amplitude spectrum of the periodic code is surprisingly the same as that of the original random drive code even though interpolation may be needed. Then Fourier transformation of the generated periodic sweep code occurs at 62 in accordance with:

$$(FP)j = \sum_{k=0}^{N_p-1} p_k e^{-2\pi ijk/N_p}.$$

The resulting Fourier representations exit 62 and then flow to correlation steps 63 and 64 after the record traces have been extended in accordance with line 59.

Now in more detail as to line 59, extension of the record traces begins at 65. The original traces enter from a record 65. Within 65, the elements of the original traces are extended by the addition of zeros at the ends of the traces to form the required extended traces of length common. That is, since there are Np samples of the extended periodic sweep code as described above, then there must be Np samples associated with the final extended record traces. Such extension begins at sample point Nd-1 of the original traces and is thereafter zeroed in the manner set forth below:

$$D = \{D_0, D_1, D_2, \ldots, D_{ND-1}, 0, 0, \ldots\}.$$

Essentially, each extended trace then comprises Np samples equal to that of the extended periodic sweep code of line 58 in which Np-Nd samples are zeroed. Then Fourier transformation of the generated traces occurs at 64. Next, the resulting representations exit from 64 for correlation with the extended periodic sweep code for generation of final digital correlogram of interest. Such correlation occurs at 66 and 67.

At 66, the Fourier transforms of the digital correlogram are calculated from the Fourier representations of the code and the extended record traces in accordance with:

$$(FC)j = (FE)j(FP)j^*.$$

Then at 67, the correlogram is generated by Fourier synthesis in accordance with:

$$Cj = \sum_{k=0}^{N_p-1} (FC)j e^{-2\pi ijk/N_p}.$$

Such correlograms surprisingly have low side lobe content whereby deeper events are readily observable.

FIGS. 9, 10 and 11 illustrate details of correlograms provided by the method of the present invention. Since a correlogram is merely the autocorrelation used in its designed convolved with the reflection series associated with the collected field data, a study of the autocorrelations of the sweeps depicted in FIG. 6 is of interest, i.e. correlations of each such sweep with itself. Such study provides the results set forth in FIGS. 9, 10 and 11.

In FIG. 9, correlating the digital drive code generated in accordance with present invention (FIG. 6) with itself using periodic sweep code correlation, produces the autocorrelation 70. Note the suppression of its side lobes. Such suppression is greater than that provided by autocorrelations 72 and 73 as explained below. Autocorrelation 71 relates to the linear sweep of FIG. 6 and was generated by linear digital correlation. Autocorrelation 72 relates to the conventional random sweep of FIG. 6 that suffers from large amplitude spectrum variations. It was generated by linear correlation. Autocorrelation 73 was provided by correlating the digital drive code generated in accordance with present invention (i.e. the same as for autocorrelation 70) but in which linear correlation was used.

FIGS. 10 and 11 illustrate the degree of side lobe suppression provided by the method of the present invention in detail.

Briefly, each plot re-orders the amplitude of each autocorrelation of FIG. 9 on a normalized, dB logarithmic scale to better illustrate degree of side lobe content. Each sample value of the autocorrelations of FIG. 9 was first rectified and then normalized to the peak value of the autocorrelation before being logarithmically plotted.

For example, in FIGS. 10 and 11, rectified autocorrelation 80 associated with the method of the present invention, has side lobes that are approximately 60 dB down from the peak value. In contrast rectified autocorrelations 82, and 83 have side lobes of much higher side lobe content. In more detail, rectified autocorrelation 81 associated with the linear sweep of FIG. 6 has side lobes that are approximately 60 dB down from the peak value. While the rectified autocorrelation 82 associated with the conventional random sweep of FIG. 6 has side lobes that are approximately 20 dB down from the peak value. Similarly, the rectified autocorrelation 83 (FIG. 11) has side lobes that are about 30 dB down from the peak value. Such rectified autocorrelation 83 relates to the random drive sweep of FIG. 6 provided by the present invention but was produced by linear (and not periodic sweep code) correlation.

Variations and alternatives in the method of the present invention are readily apparent to those skilled in the art. For example, while the present description in the construction of the digital code of the present invention has emphasized the use of the autocorrelation of the conventional "chirp" signal as the starting point in the subsequent frequency domain construction process, other types of imbedded signals of merit can be substituted as required. In this regard, the Ricker wavelet has been tested and found to be adequate.

By definition, the Ricker wavelet is a seismic waveform resulting from the transmission of a seismic impulse through an ideal viscoelastic material with attenuation proportional to frequency, see Ricker, "THE FORM AND LAWS OF PROPAGATION OF SEISMIC WAVELETS", Geophysics, v. 18, p 10–40.

FIG. 6 illustrates the result of generating a digital random phase sweep 90 using Ricker amplitude spectrum 91 as depicted in FIG. 7. FIG. 9 illustrates that autocorrelation 92 associated with sweep 90 of FIG. 6 and correlated with itself using periodic sweep code correlation, has unusually low side lobe content. FIG. 10 illustrates the Ricker rectified autocorrelation 93 to better document its superiority.

Addition variations in the use of the present invention are also readily apparent to those skilled in the art. In a similar manner, exploration areas other than urban areas, may also be beneficiaries of improvements using the teachings of the present invention especially if they are "noisy areas". For example, permafrost areas such as Alaska where seismic lines are continued into the sea from land like, are ideal environments for use of the method of the present invention. Flexure waves which can be generated simultaneously with the conventional vibratory waves, can be surprisingly suppressed using the method of the present invention.

What is claimed is:

1. A method of producing and recording random non-impulsive vibrations in the earth comprising the steps of:

(i) producing over a time duration ts said non-impulsive vibrations by activating at least one vibratory source with a digital random sweep code comprising a number $n_s$ of uniformly sampled random numbers and a sampling interval $\Delta t$, the time duration $t_s$, the number of $n_s$, and the sampling interval related by $t_s = (n_s - 1)\Delta t$, said code resulting from an inverse Fourier transformation of a sequence of complex numbers having a form:

$$a_k e^{i\phi_k}$$

where e is the base of natural logrithms, i is the square root of $-1$, $a_k$ is an amplitude spectrum, k is a component index, and $\phi_k$ is a frequency spectrum, said code controlling said vibratory source in a repetitive but random manner;

(ii) recording over a second time duration received seismic vibrations that have propogated through the earth from said vibratory source to at least one receiver;

(iii) cross-correlating said received seismic vibrations with said control code such that said code maintains domain consistency during cross-correlation, said correlation corresponding to a pre-specified autocorrelation.

2. The method of claim 1 wherein the autocorrelation has a zero lag line appropriate to an exploration objective.

3. The method of claim 1 wherein step (iii) is carried out in a frequency domain after said code has been extended to maintain domain consistency so as to define an extended digital periodic sweep code, said extended periodic sweep code being a k-fold repetition of the code, where k is a positive integer greater than 1.

4. The method of claim 3 wherein k=2.

5. The method of claim 1 in which step (iii) is carried out in a time domain after said code has been extended to maintain domain consistency in an extension, said extension being bi-directional and defining two equivalent repetition time intervals, $t_2$ and $t_3$, one forward in time and one backward in time from original representations of the code but each correctly mated head and tail relative to said original representations of the code so as to maintain domain consistency.

6. The method of claim 5 in which the equivalent repetition time intervals are equal to each other and to said time duration $t_s$.

7. The method of claim 1 in which the primary term of the augmented Fourier transform of step (i) is:

$$a_k e^{(i\phi k)}$$

where k is $0 \leq k \leq n_s - 1$.

8. The method of claim 7 in which the Fourier transformation is in accordance with:

$$d_j = \sum_{k=0}^{n_s-1} a_k e^{(i\phi k)} e^{(\frac{2\pi i j k}{n_s})}$$

where $d_j$ is the control code and j is an indexing number.

9. A method of constructing a random digital control code for driving a non-impulsive vibratory source to inject random non-impulsive vibrations into the earth comprising:

(i) pre-specifying that resulting correlation correspond to a pre-specified autocorrelation having a sequence of uniformly sampled random numbers having a number of points $n_s$ and a sampling interval $\Delta t$, and a time duration of the autocorrelation, the number points of the autocorrelation and the sampling interval of the autocorrelation are the same as for a control code, said autocorrelation further comprising an amplitude versus time, imbedded wavelets;

(ii) using a sequence of real numbers $a_k$, $0 \leq k \leq n_s - 1$, as an amplitude spectrum of a Fourier transform of the control code, said $a_k$ being a Fourier transform of the autocorrelation and k being a summation index;

(iii) using a random sequence of real numbers $\phi_k$, as a phase spectrum of the Fourier transform of the control code, said sequence $\phi_k$ being constructed in accordance with:

$$\phi_k = 2\pi n_k$$

where $n_k$ is any sequence of random real numbers between 0 and 1, $0 \leq n_k \leq -1$;

(iv) constructing an inverse Fourier transform of the control code as a sequence of complex numbers $a_k e^{i\phi_k}$ and inverse transforming the Fourier transform of the control code in accordance with:

$$d_j = \sum_{k=0}^{n_s-1} a_k e^{(i\phi k)} e^{(\frac{2\pi ijk}{n_s})}$$

where $d_j$ is the control code $0 \leq j \leq n_s - 1$, e is the base of natural logrithms, and i is $\sqrt{-1}$.

10. The method of claim 9 in which step (ii) includes the substeps of:

(a) generating an amplitude spectrum of the Fourier transform of the control code from the autocorrelation, said autocorrelation being a uniformly sampled sequence of real numbers, $A_k$, comprised of the number of points, ns, and the sampling interval, $\Delta t$, as the control code, a square of said amplitude spectrum being a power spectrum, $p_j$, and formed in accordance with:

$$p_j = P_j P_j^*$$

where $P_j^*$ is the complex conjugate of $P_j$ and $P_j$ is:

$$P_j = \sum_{k=0}^{n_s-1} A_k e^{i\phi k} e^{\frac{2\pi ijk}{n_s}} \quad 0 \leq j \leq n_s - 1;$$

(b) generating an amplitude spectrum $a_j$ from the sequence of $P_j$ in accordance with:

$$a_j = \sqrt{p_j} \quad 0 \leq j \leq n_s - 1.$$

11. A method of constructing a digital correlogram for driving a non-implosive vibratory source $C = \{C_0, C_1, \ldots, C_{n_l-1}\}$ where $n_l$ is a number of samples associated with a listed time $t_l = (n_l - 1)\Delta t$ where $\Delta t$ is a sampling interval, said digital correlogram being formed by correlating (a) a digital random code, $S = \{S_1, S_2, \ldots, S_{n_s-1}\}$ where $n_s$ is the number of samples in the code associated with a temporal duration $t_s = (n_s - 1)\Delta t$ with (b) a trace digital record collected in a field defined as $D = \{D_0, D_1, \ldots, D_{nd-1}\}$ where $n_d$ is the number of samples of the digital record, each correlation of the correlogram defining a pre-specified autocorrelation of merit from which amplitude and phase spectra for code can be calculated in a frequency domain comprising the steps of:

(i) replicating the digital random code S to form a periodic digital sweep code $P = \{S_0, S_1, \ldots, S_{ns-1}, S_0, S_1, \ldots\}$ where said periodic sweep code P is a k-fold replication of the digital random code S having $n_p$ samples where $n_p = k n_s$ where k is a positive integer greater than one, and non-zero elements of an amplitude spectrum of the periodic digital sweep are the same as the elements of an amplitude spectrum of the digital random code corresponding to common frequencies;

(ii) constructing an extended digital record E having $n_p$ samples by padding the digital record D with additional zero samples in accordance with:

$$E = \{D_0, D_1, \ldots, D_{nD-1}, 0, 0, \ldots\}$$

where there are ($n_P - n_d$) zero samples, $n_d$ being the number of samples of the digital record D;

(iii) cross-correlating the period digital sweep code, P, with the extended digital record, E, while domain consistency is maintained, the resulting correlations being a survey record of time $t_l$.

12. The method of claim 11 in which step (iii) further comprises the substeps of:

(a) calculating digital Fourier transforms of the periodic digital sweep code P and the extended record E in accordance with:

$$(FP)_j = \sum_{k=0}^{n_P-1} P_k e^{2\pi \frac{ijk}{nP}};$$

where $(FP)_j$ are elements of the digital Fourier transform of the periodic digital sweep code, $P_k$ are elements of the periodic digital sweep code, and the indicies j and k are both positive integers from 0 to $n_p$, and $$(FE)_j = \sum_{k=0}^{n_P-1} E_k e^{2\pi \frac{ijk}{nP}};$$

where $(FE)_j$ are elements of the digital Fourier transform of the extended record E, where $E_k$ are the elements of the extended digital record;

(b) calculating the Fourier transforms of the digital correlogram in accordance with:

$$(FC)_j = (FE)_j (FP)_j^*$$

where $(FP)_j^*$ is the complex conjugate of $(FP)k$ and $(FC)j$ are elements of the Fourier transforms of the digital correlogram;

(c) Fourier synthesizing the Fourier transforms of the digital correlogram of step (b) to form a digital correlogram in accordance with:

$$C_j = \sum_{k=0}^{n_P} (FC)_k e^{\frac{2\pi ijk}{nP}}$$

wherein the first $n_l$ samples are the correlograms of the survey record of interest.

* * * * *